(12) United States Patent
Onishi

(10) Patent No.: US 8,169,614 B2
(45) Date of Patent: May 1, 2012

(54) RECORDING APPARATUS

(75) Inventor: Wataru Onishi, Chino (JP)

(73) Assignee: Seiko Epson Corporation, Tokyo (JP)

( * ) Notice: Subject to any disclaimer, the term of this patent is extended or adjusted under 35 U.S.C. 154(b) by 261 days.

(21) Appl. No.: 12/612,044

(22) Filed: Nov. 4, 2009

(65) Prior Publication Data

US 2010/0110435 A1 May 6, 2010

(30) Foreign Application Priority Data

Nov. 6, 2008 (JP) ................................. 2008-285991
Jan. 16, 2009 (JP) ................................. 2009-007584

(51) Int. Cl.
*G01J 3/46* (2006.01)
(52) U.S. Cl. ....................................... 356/402; 356/407
(58) Field of Classification Search .................. 356/402, 356/407, 408, 411, 413, 418, 421–424; 347/3, 347/7, 50, 87, 86, 18, 57–59, 48–49
See application file for complete search history.

(56) References Cited

U.S. PATENT DOCUMENTS 6,113,207 A * 9/2000 Nakano et al. ..................... 347/3

FOREIGN PATENT DOCUMENTS

JP 11-004353 1/1999

* cited by examiner

*Primary Examiner* — Tri T Ton
(74) *Attorney, Agent, or Firm* — Workman Nydegger

(57) ABSTRACT

A recording apparatus includes a colorimeter that obtains color measurement data from a recording surface of a recording material, a colorimeter holder that holds the colorimeter, a colorimeter carriage that reciprocates the colorimeter holder on a retainer member that holds the recording material during color measurement, and a link mechanism that links the colorimeter holder and the colorimeter carriage. The colorimeter holder is linked by the link mechanism rotatably by a predetermined angle around a first axis along the reciprocating direction on the retainer member, and rotatably by a predetermined angle around a second axis along the surface of the recording material held by the retainer member and perpendicular to the reciprocating direction.

8 Claims, 16 Drawing Sheets

$F = N1 + N2$
$\quad = P1 + W \cdot \cos\theta$
$P2 = W \cdot \sin\theta$
EQUILIBRIUM OF MOMENT
ABOUT POINT O IS:
$P1 \cdot L2 = N1 \cdot L1 - N2 \cdot L1 + W \cdot L3 - P2 \cdot L4$
IF $N1 = N2$,
$P1 \cdot L2 = W \cdot L3 - P2 \cdot L4$

RECORDING APPARATUS

BACKGROUND

1. Technical Field

The present invention relates to a recording apparatus having a color measuring device that measures the color of a color measuring pattern recorded on a recording material with a colorimeter.

2. Related Art

In printed matter production sites, color proofing is performed. Specifically, before starting printing, a proof print is generated, and it is checked whether or not the color of image data is faithfully reproduced by reference to an image displayed on the proof print and verification color patches displayed together with the image.

Digital matching in which the color of an image on a CRT monitor is electronically matched to the color of an image displayed on the proof print output from an output device such as a printer or an image setter on the basis of a color management file called "profile" is widely prevalent and is carried out in print data production sites and printed matter production sites (JP-A-11-004353).

To reduce the time required to generate a proof print, a form of color proofing called "simplified proofing" in which a proof sheet is output directly from print data for plate making is widely prevalent. For outputting such a proof sheet, an ink jet recording apparatus mounted with a color measuring device is used.

An ink jet recording apparatus mounted with a color measuring device includes a colorimeter that obtains color measurement data from a recording surface of a recording material serving as a proof sheet, a colorimeter holder that holds the colorimeter, a colorimeter carriage that reciprocates the colorimeter holder on a retainer member that holds the recording material during color measurement, and a link mechanism that links the colorimeter holder and the colorimeter carriage.

The colorimeter holder and the retainer member are designed to be parallel to each other. However, components of the color measuring device always have dimension errors. Assembly errors and deformations over time are added to the dimension errors, and warping, undulation, or torsion occurs. Therefore, actually, the colorimeter holder and the retainer member are not always parallel to each other as designed. Although wheels of the colorimeter holder have to be in contact with a guide surface of the retainer member, some of the wheels can be out of contact with the guide surface. If any of the wheels are out of contact with the guide surface, the distance between the colorimeter and the recording material held by the retainer member is not uniform throughout a color measuring region. This variation in the distance results in a deterioration in color measurement accuracy.

SUMMARY

An advantage of some aspects of the invention is to maintain a uniform distance between the colorimeter and the recording material held by the retainer member throughout the color measuring region and to thereby prevent a deterioration in color measurement accuracy when the colorimeter holder and the retainer member are not parallel to each other as designed due to dimension errors of components of the color measuring device.

According to a first aspect of the invention, a recording apparatus includes a colorimeter that obtains color measurement data from a recording surface of a recording material, a colorimeter holder that holds the colorimeter, a colorimeter carriage that reciprocates the colorimeter holder on a retainer member that holds the recording material during color measurement, and a link mechanism that links the colorimeter holder and the colorimeter carriage. The colorimeter holder is linked by the link mechanism rotatably by a predetermined angle around a first axis along the reciprocating direction on the retainer member, and rotatably by a predetermined angle around a second axis along the surface of the recording material held by the retainer member and perpendicular to the reciprocating direction.

According to this aspect, the colorimeter holder is linked by the link mechanism rotatably by a predetermined angle around a first axis along the reciprocating direction on the retainer member, and rotatably by a predetermined angle around a second axis along the surface of the recording material held by the retainer member and perpendicular to the reciprocating direction, and therefore the following advantageous effects can be obtained. When the colorimeter holder and the retainer member are not parallel to each other as designed, the colorimeter holder rotates around the first axis and the second axis at each position when the colorimeter holder moves on the retainer member, and the deviation from the parallelism can be automatically absorbed. Therefore, the distance between the colorimeter and the recording material held by the retainer member can be maintained uniform throughout the color measuring region, and a deterioration in color measurement accuracy can thereby be prevented.

According to a second aspect of the invention, in the recording apparatus of the first aspect, the link mechanism has a pair of first and second links on each of the front and rear sides in the reciprocating direction; first ends of the first link and the second link are rotatably connected through a first linking shaft and a second linking shaft to the colorimeter carriage, and second ends of the first link and the second link are rotatably connected through a third linking shaft and a fourth linking shaft to the colorimeter holder; and on at least one of the first end side and the second end side of the first link and the second link, one of the linking shafts is movable within a predetermined range in a pressing direction of the retainer member, and the other linking shaft is movable within a predetermined range in the pressing direction and a direction along the second axis perpendicular to the pressing direction.

Due to the movable structure of the linking shafts in the pair of first and second links provided on each of the front and rear sides in the reciprocating direction, the advantageous effect of the first aspect can easily be obtained.

In terms of stability, it is preferable that the movable structure of the linking shafts be applied to the first and second linking shafts on the side where the first and second links are rotatably connected to the colorimeter carriage.

In terms of stability, it is preferable that the link structure movable in two directions, the pressing direction and the direction perpendicular to the pressing direction, be applied to the first linking shaft of the first link located away from the retainer member.

According to a third aspect of the invention, in the recording apparatus of the first aspect, the retainer member includes a retainer plate that presses the recording material, and a support arm to which the retainer plate is rotatably connected through a shaft; and the shaft is rotatably supported so as to be at least partially movable in the pressing direction.

Since at least part of the shaft of the connection between the retainer plate and the support arm is rotatably supported so as to be movable in the pressing direction, a degree of freedom is given to the connection by the movable structure, and the retainer plate can be deflection-deformed along the recording surface of the recording material. Therefore, even if the surface supporting the recording material is uneven or the retainer plate itself is deflected, the unevenness or deflection is absorbed by the movable structure, the distance between the colorimeter holder and the recording material is maintained uniform, and the color measurement accuracy of the colorimeter can be maintained high.

According to a fourth aspect of the invention, in the recording apparatus of the first aspect, the retainer member is formed of a flexible material and is supported so as to permit rotation around an axis parallel to the reciprocating direction and partial deflection deformation.

According to a fifth aspect of the invention, in the recording apparatus of the first aspect, a transport guide surface that supports the recording material and guides the transport is a sloping surface or a horizontal surface. That is, whether the transport guide surface that supports the recording material and guides the transport is a sloping surface or a horizontal surface, the invention is applicable.

According to a sixth aspect of the invention, in the recording apparatus of the first aspect, the colorimeter holder has wheels for moving on the retainer member during color measurement, the wheels including a base end side wheel and a free end side wheel; and the recording apparatus further includes a contact mechanism for bringing both the base end side wheel and the free end side wheel into contact with the retainer member at the same time during color measurement.

According to this aspect, the colorimeter holder has wheels for moving on the retainer member during color measurement, the wheels including a base end side wheel and a free end side wheel, and the recording apparatus further includes a contact mechanism for bringing both the base end side wheel and the free end side wheel into contact with the retainer member at the same time during color measurement. Therefore, the colorimeter and the colorimeter holder can be forcibly maintained parallel to the retainer member, and the color measurement accuracy of the colorimeter can thereby be maintained high.

According to a seventh aspect of the invention, in the recording apparatus of the sixth aspect, the surface of the recording material held by the retainer member is a sloping surface; and the contact mechanism includes a first spring that urges the colorimeter holder toward the retainer member, the link mechanism that suspends the colorimeter holder, and the colorimeter holder to which the colorimeter is attached and that generates a force pressing in the direction of gravitational force due to its own weight. The line of action of the resultant pressing force F generated toward the retainer member by the resultant force of the urging force P1 of the first spring, the suspending force P2 of the link mechanism, and the weight W of the colorimeter holder to which the colorimeter is attached is substantially the same as the normal to the sloping surface passing between the base end side wheel and the free end side wheel. That is, the resultant pressing force F generated toward the retainer member by the resultant force of the urging force P1 of the first spring, the suspending force P2 of the link mechanism, and the weight W of the colorimeter holder to which the colorimeter is attached acts on an intermediate part between the base end side wheel and the free end side wheel.

According to this aspect, the resultant pressing force F generated toward the retainer member acts on an intermediate part between the base end side wheel and the free end side wheel, and therefore the contact mechanism of the sixth aspect can be reasonably constructed. This structure is effective especially in a recording apparatus in which the surface of the recording material held by the retainer member is a sloping surface.

According to an eighth aspect of the invention, in the recording apparatus of the sixth aspect, the surface of the recording material held by the retainer member is a horizontal surface; the contact mechanism includes a first spring that urges the colorimeter holder toward the retainer member, and the colorimeter holder to which the colorimeter is attached and that generates a force pressing in the direction of gravitational force due to its own weight. The line of action of the resultant pressing force F generated toward the retainer member by the resultant force of the urging force P1 of the first spring and the weight W of the colorimeter holder to which the colorimeter is attached is substantially the same as the normal to the horizontal surface passing between the base end side wheel and the free end side wheel. That is, the resultant pressing force F generated toward the retainer member by the resultant force of the urging force P1 of the first spring and the weight W of the colorimeter holder to which the colorimeter is attached acts on an intermediate part between the base end side wheel and the free end side wheel.

BRIEF DESCRIPTION OF THE DRAWINGS

The invention will be described with reference to the accompanying drawings, wherein like numbers reference like elements.

DESCRIPTION OF EXEMPLARY EMBODIMENTS

A recording apparatus having a color measuring device unit according to the invention will be described. First, an ink jet recording apparatus 100 will be taken as the best mode for carrying out the invention, and its overall structure will be outlined with reference to the drawings. The ink jet recording apparatus 100 described here is a large-sized ink jet recording apparatus that can perform recording on a large-sized, for example, A3 size or larger sheet of recording material P (hereinafter also referred to as single sheet P) or a large-sized, for example, A1 size or A1 plus size or B0 size or B0 plus size roll of recording material R (hereinafter also referred to as roll paper R).

Figure 1:
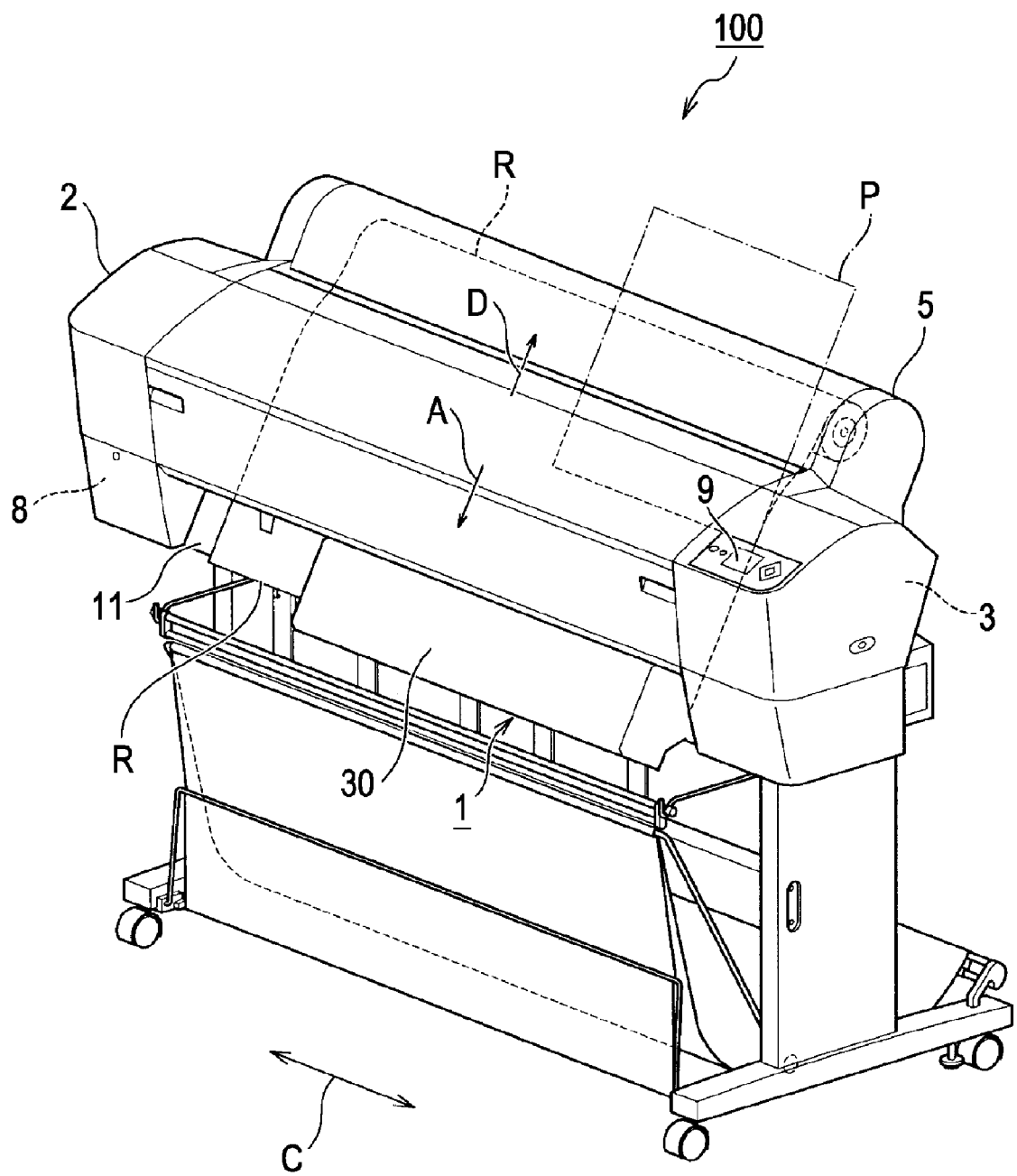
FIG. 1 is a perspective view showing the appearance of an ink jet recording apparatus with a main body cover attached.
Figure 2:
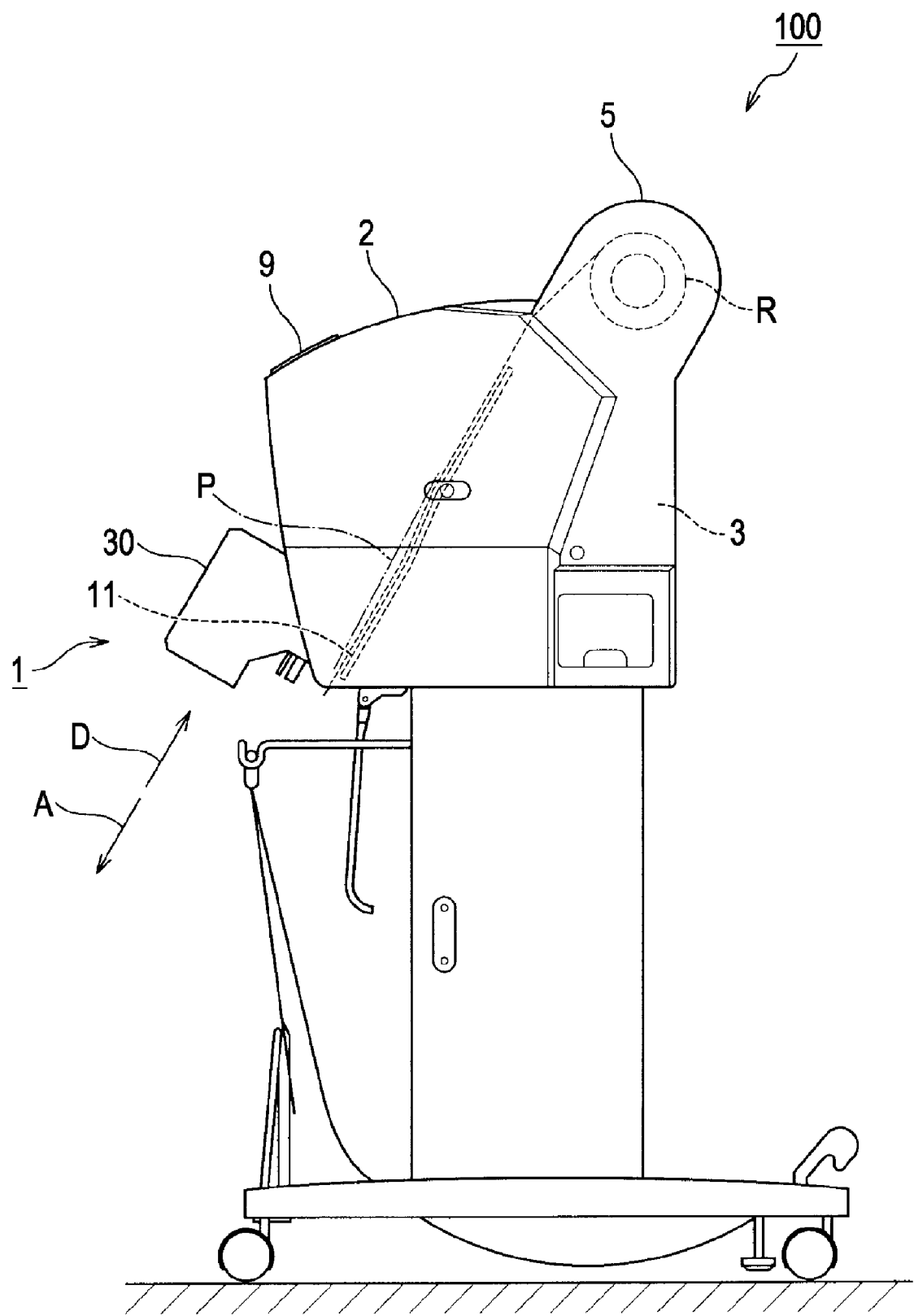
FIG. 2 is a side view showing the appearance of the ink jet recording apparatus with the main body cover attached.
Figure 3:
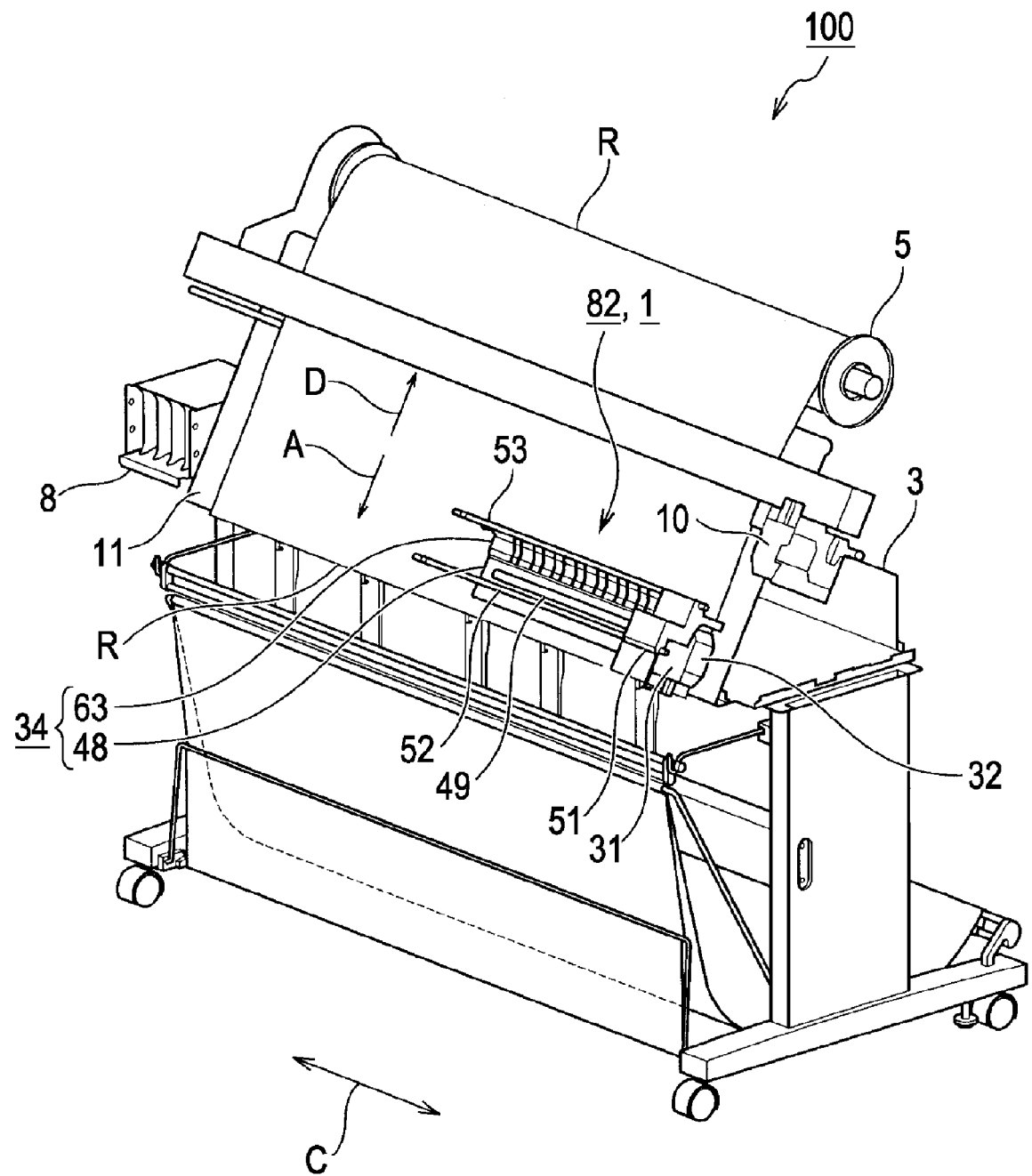
FIG. 3 is a perspective view showing the ink jet recording apparatus with the main body cover removed.
Figure 4:
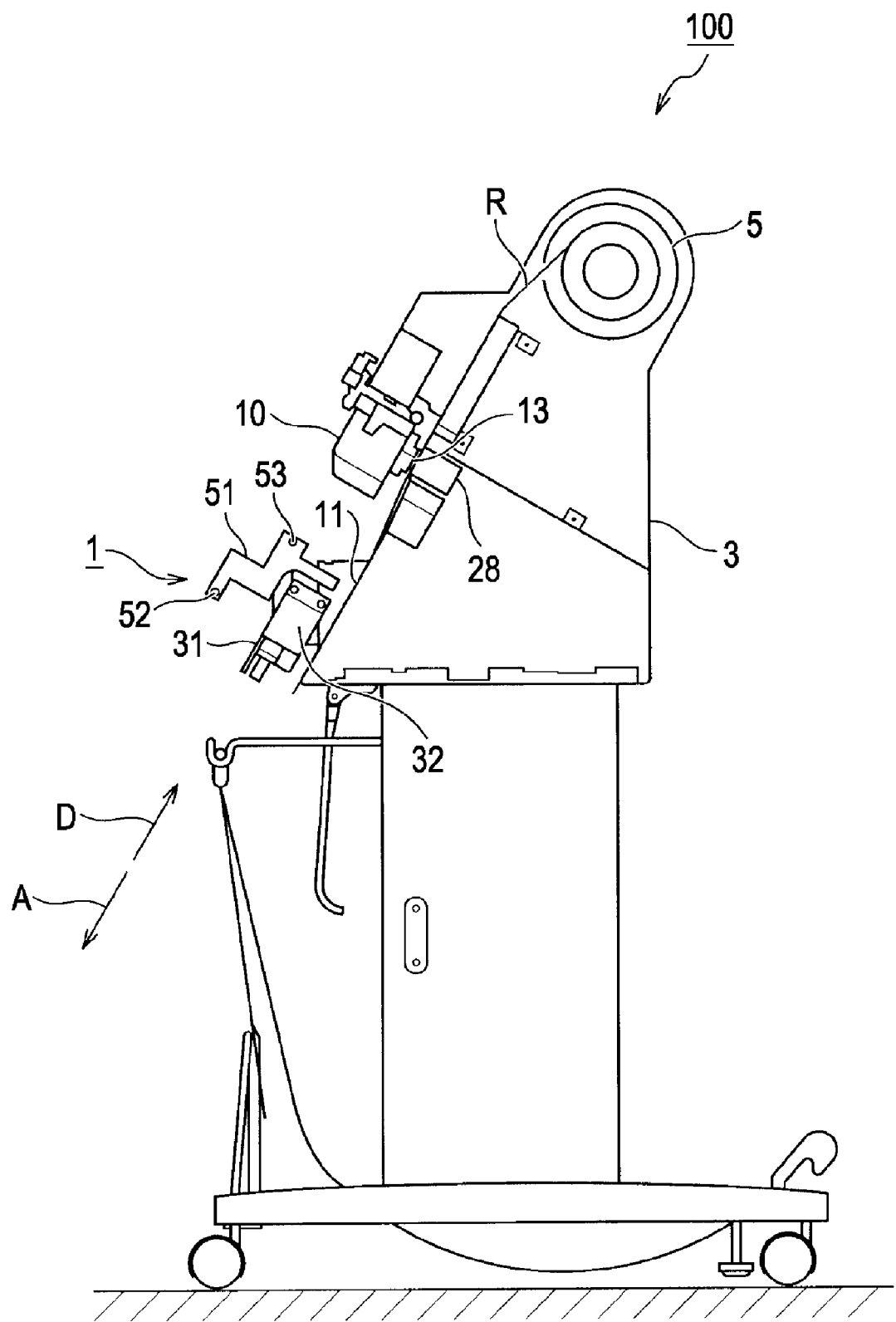
FIG. 4 is a side view showing the ink jet recording apparatus with the main body cover removed.
Figure 5:
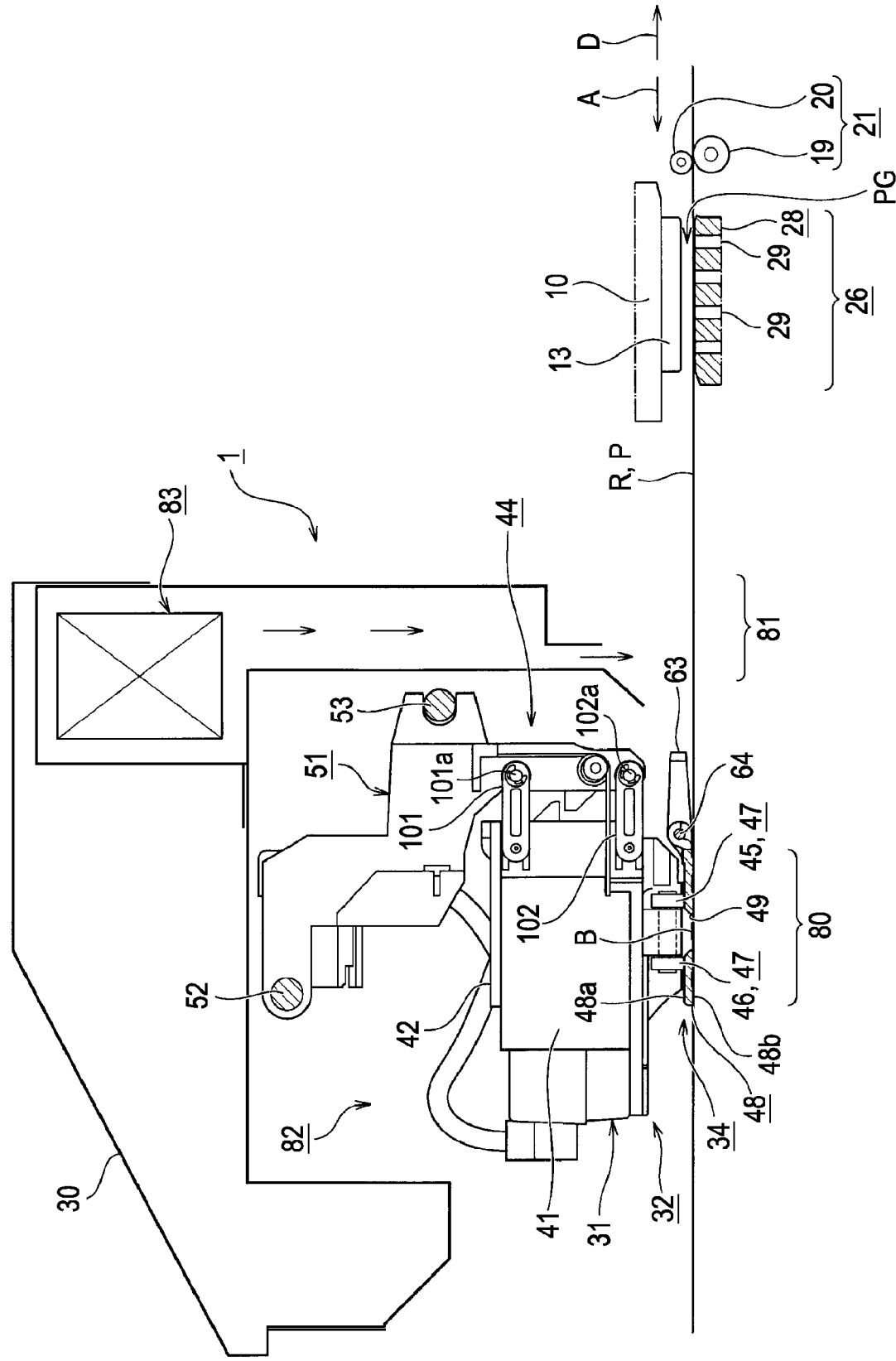
FIG. 5 is a side sectional view showing the outline of the internal structure of the ink jet recording apparatus.

FIG. 1 is a perspective view showing the appearance of an ink jet recording apparatus with a main body cover attached. FIG. 2 is a side view showing the appearance of the ink jet recording apparatus with the main body cover attached. FIG. 3 is a perspective view showing the ink jet recording apparatus with the main body cover removed. FIG. 4 is a side view showing the ink jet recording apparatus with the main body cover removed. FIG. 5 is an essential part side sectional view showing the outline of the internal structure of the ink jet recording apparatus.

The shown ink jet recording apparatus 100 includes a recording apparatus main body 3 as shown in FIGS. 3 and 4. The recording apparatus main body 3 is covered by a main body cover 2 as shown in FIGS. 1 and 2. In the upper part of the rear of the recording apparatus main body 3, a roll paper holder 5 is provided that includes a spindle that can hold a roll paper R and a pair of flange-like roll paper retainers. In, for example, the left part of the front of the recording apparatus main body 3, a cartridge holder 8 is provided that has a plurality of cartridge slots into which respective colors of ink cartridges can be loaded separately.

In, for example, the right part of the front of the ink jet recording apparatus 100, an operation panel 9 is provided through which various operation commands are input. The operation panel 9 is supported by an appropriate bracket. The recording apparatus main body 3 is provided with a transport guide plate 11. The transport guide plate 11 slopes down to the front at an angle of about 60 degrees and serves as a transport guide surface that supports a recording material P from below and guides the transport. The transport guide plate 11 guides the roll paper R or the single sheet P held by the roll paper holder 5 forward and downward, or in the transport direction A. The upper surface of the transport guide plate 11 faces a below-described colorimeter 31 of the recording apparatus main body 3 and serves as a holding surface that holds the recording material.

As shown in FIG. 5, upstream in the path of transport of the roll paper R or the single sheet P, a transport roller 21 is provided that includes a pair of nip rollers: a transport driving roller 19 and a transport driven roller 20. The transport driving roller 19 is, for example, a roller that can be rotated in forward and reverse directions. The roll paper R or the single sheet P nipped by the transport roller 21 is transported in both the forward and downward transport direction A and the backward and upward return direction D.

Downstream of the transport roller 21, a recording position 26 is provided. Above the recording position 26, a recording head 13 is located. The recording head 13 is held by a carriage 10 and can reciprocate in the width direction of the recording apparatus main body 3. Below the recording position 26, a platen 28 is provided, with a gap PG therebetween. The platen 28 has suction holes 29 formed therein. By air suction through the suction holes 29, the roll paper R or the single sheet P being transported on the platen 28 is attached to the platen 28. Recording is performed on the roll paper R or the single sheet P, and the roll paper R or the single sheet P is transported to a drying region 81 and a color measuring region 80 downstream. The drying in the drying region 81 and the color measurement in the color measuring region 80 are performed by a detachable color measuring device unit 1 covered by a housing cover 30.

Embodiment

Figure 6:
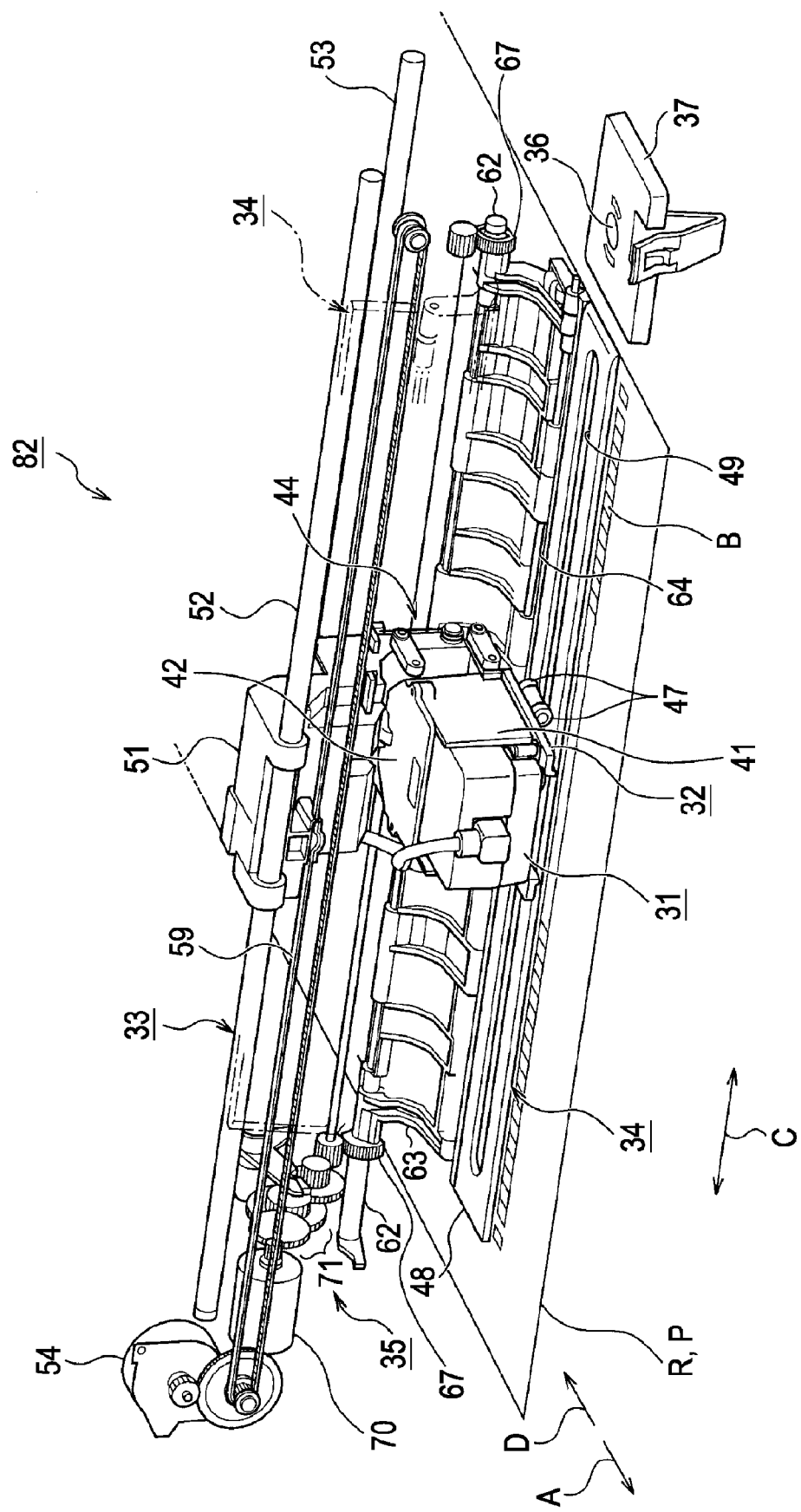
FIG. 6 is a perspective view showing the operation of a color measuring device during color measurement.
Figure 7:
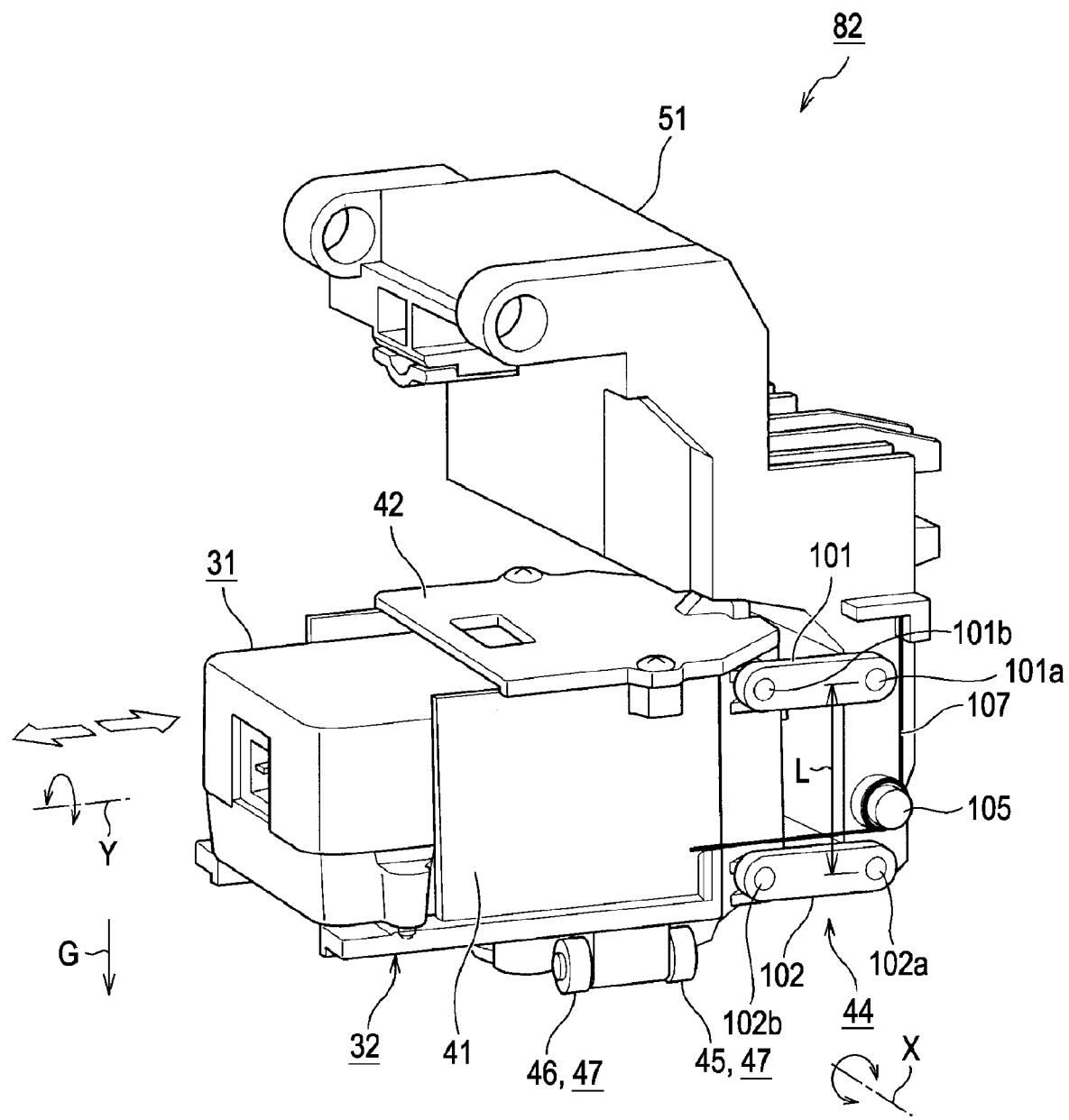
FIG. 7 is a perspective view showing the structure of the color measuring device.
Figure 8:
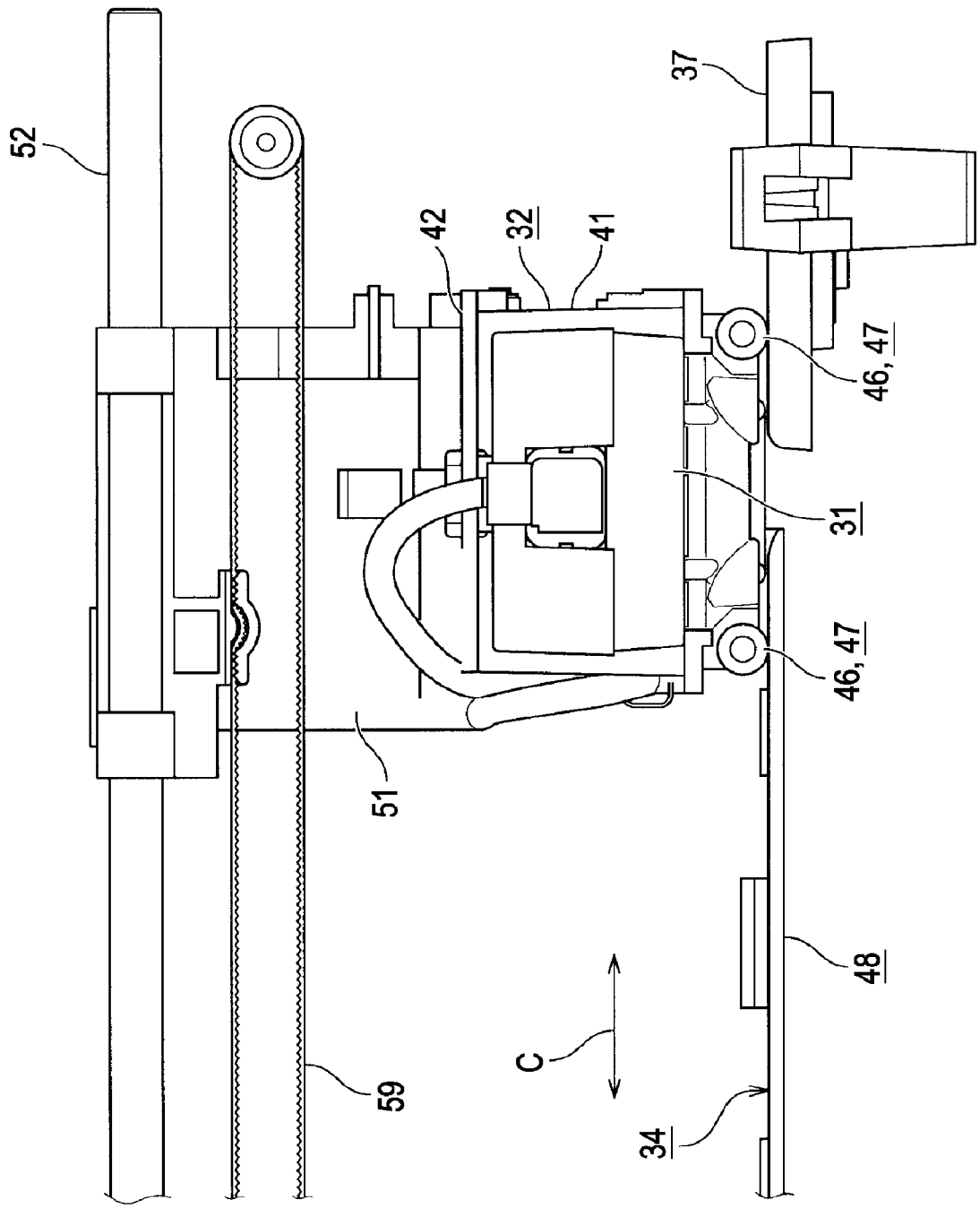
FIG. 8 is a front view showing the operation of the color measuring device during color measurement.
Figure 9:
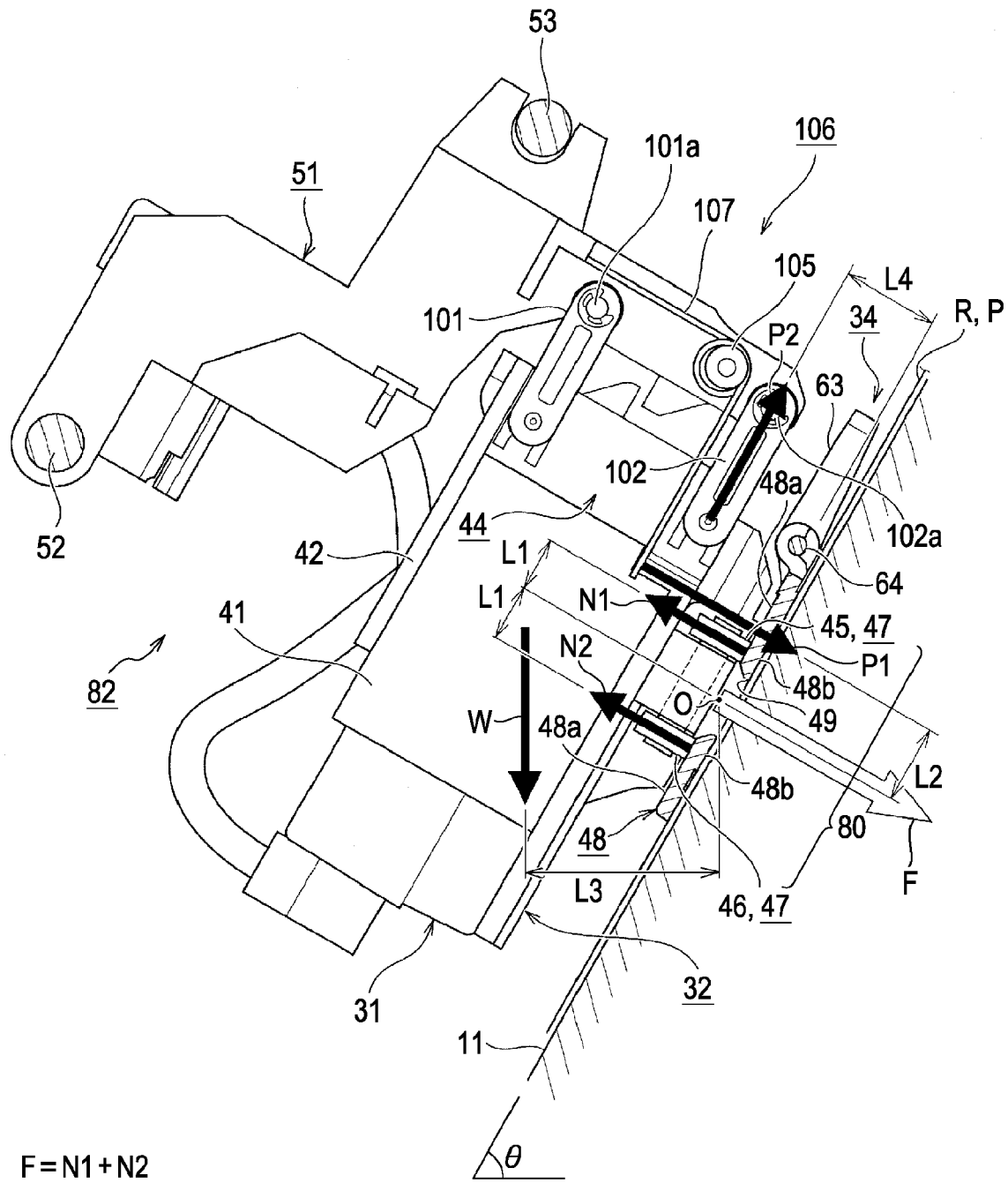
FIG. 9 is a side view showing the relationship between the structure of the color measuring device and the force transmitted to a retainer member.
Figure 10:
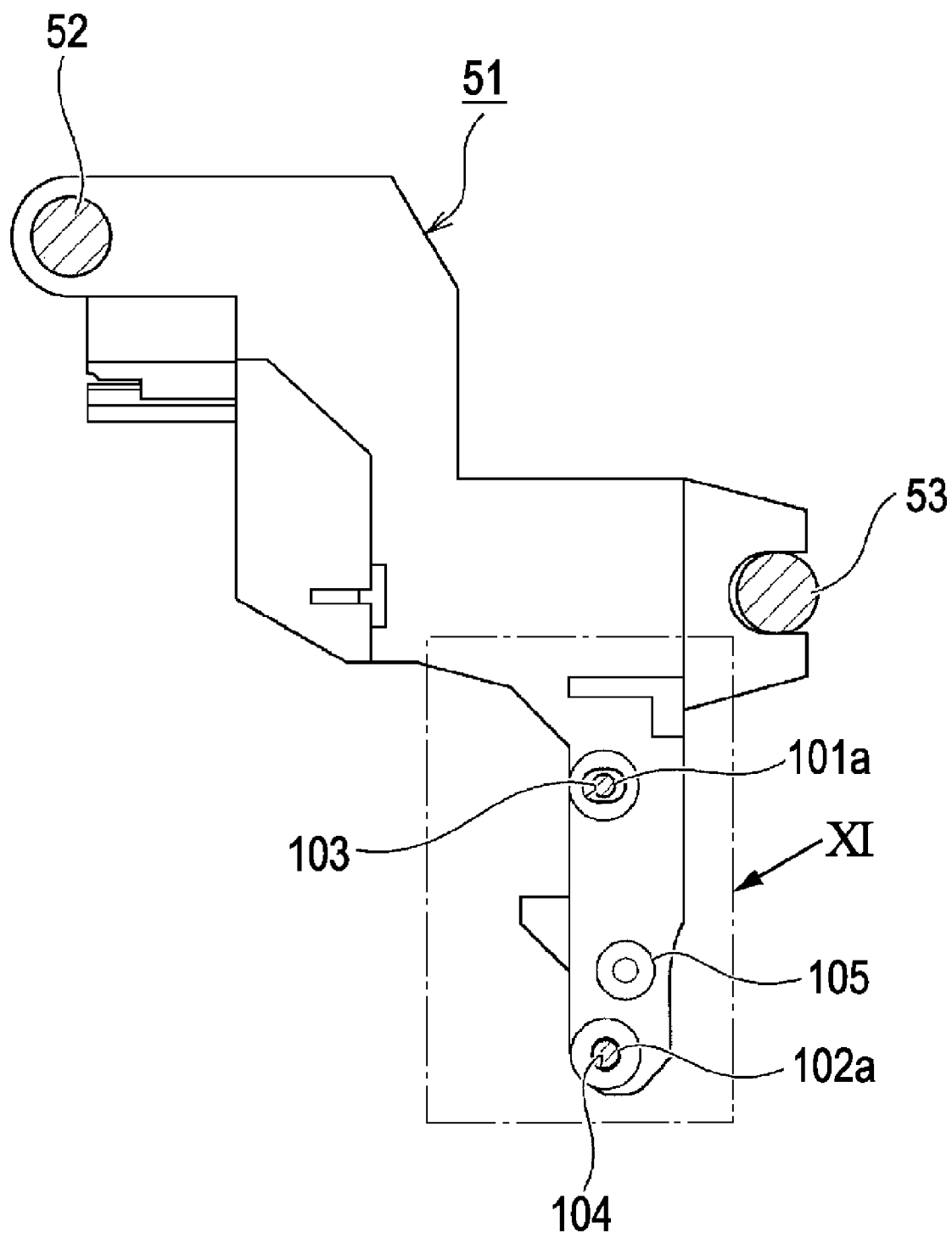
FIG. 10 is a side view showing a colorimeter carriage.
Figure 11:
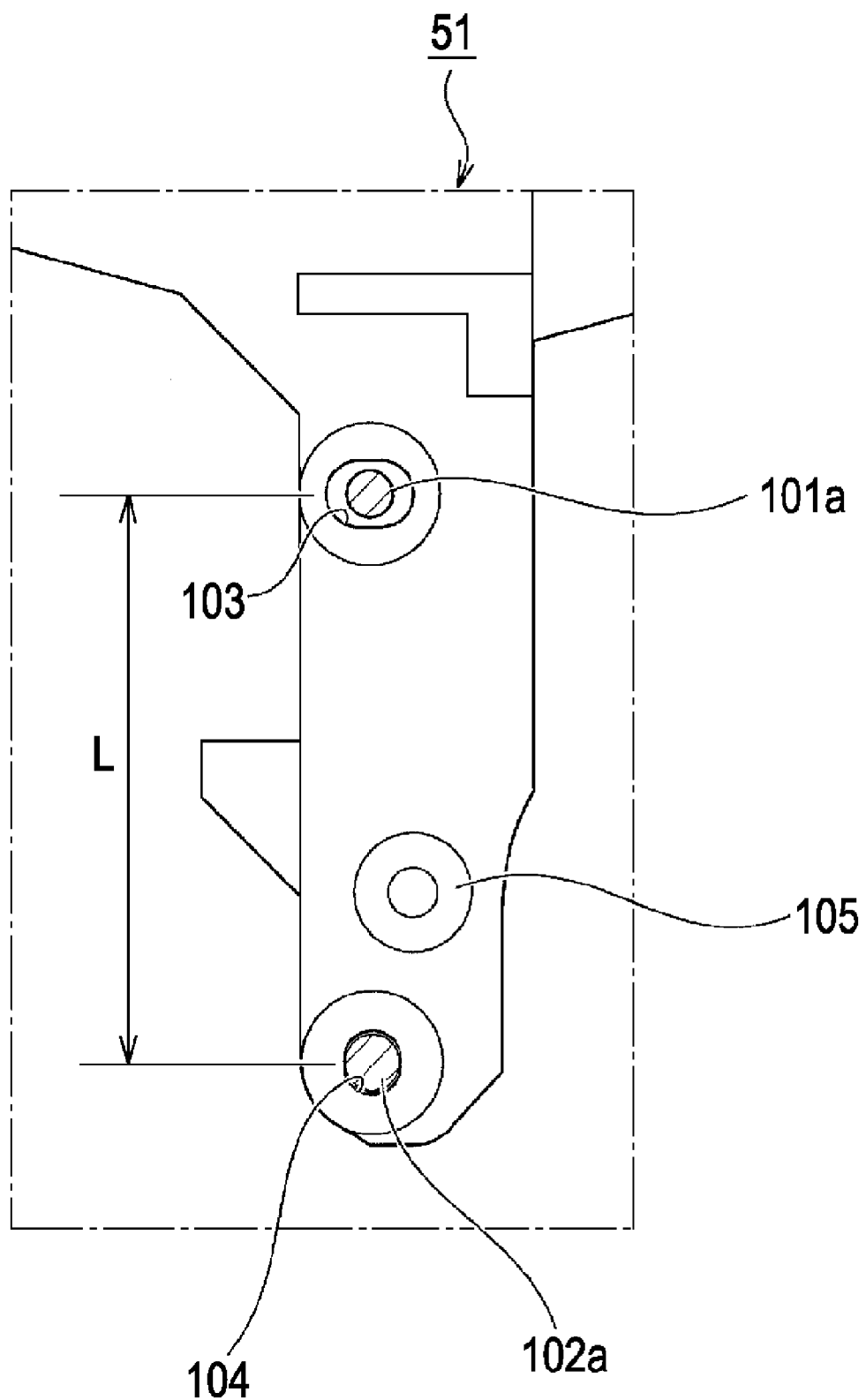
FIG. 11 is an enlarged view of the part XI in FIG. 10.
Figure 12:
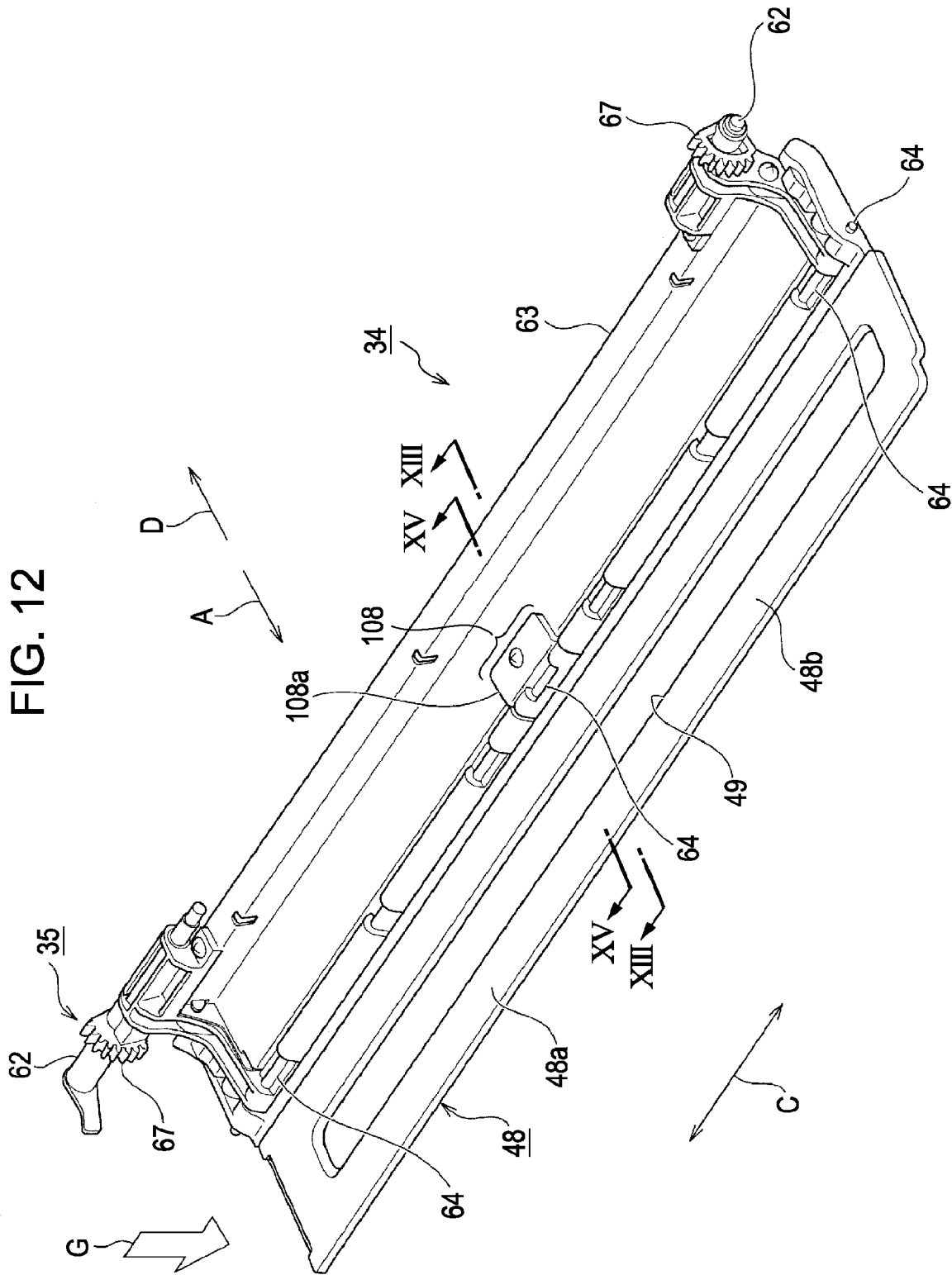
FIG. 12 is a perspective view showing the retainer member.
Figure 13:
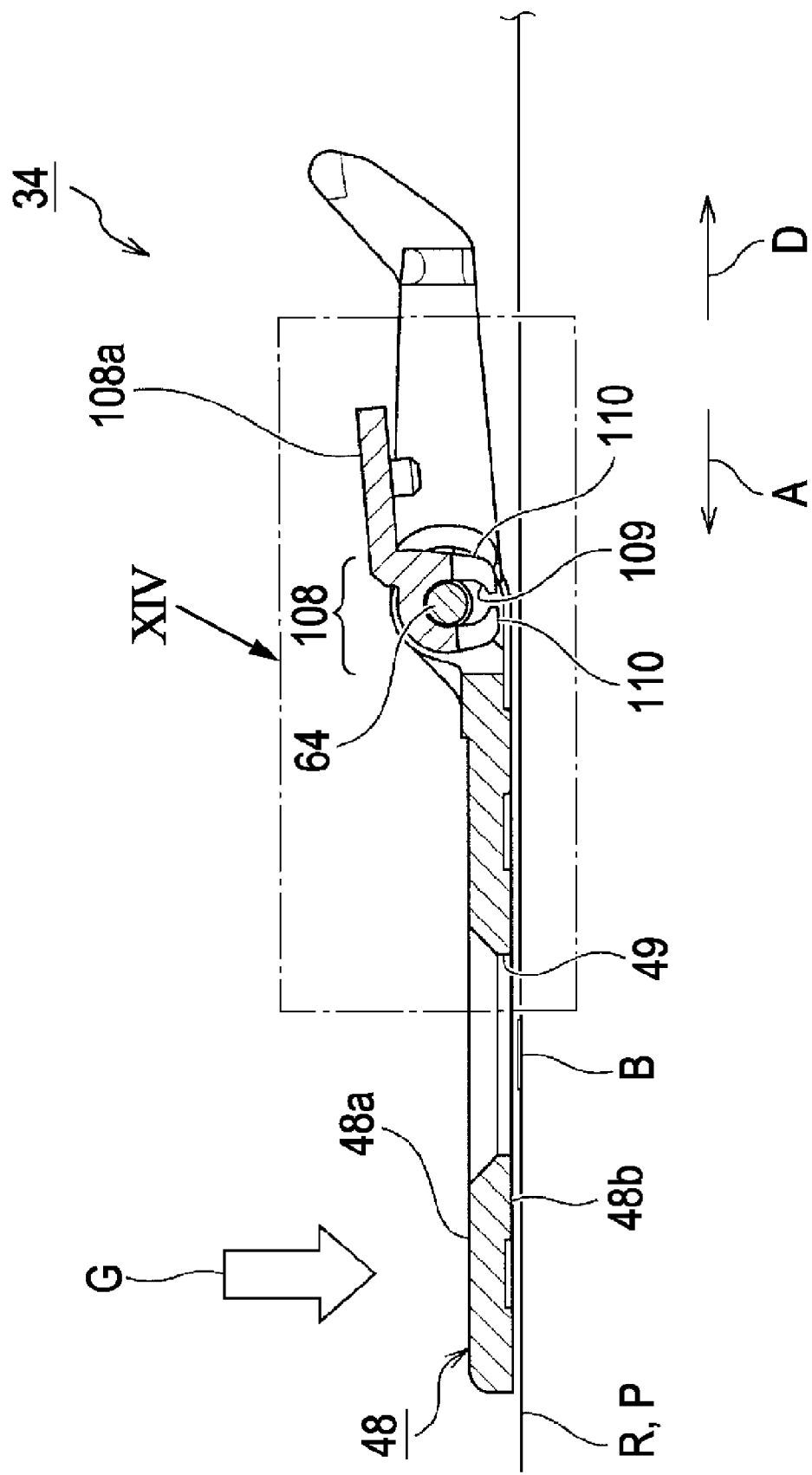
FIG. 13 is a sectional view taken along line XIII-XIII of FIG. 12.
Figure 14:
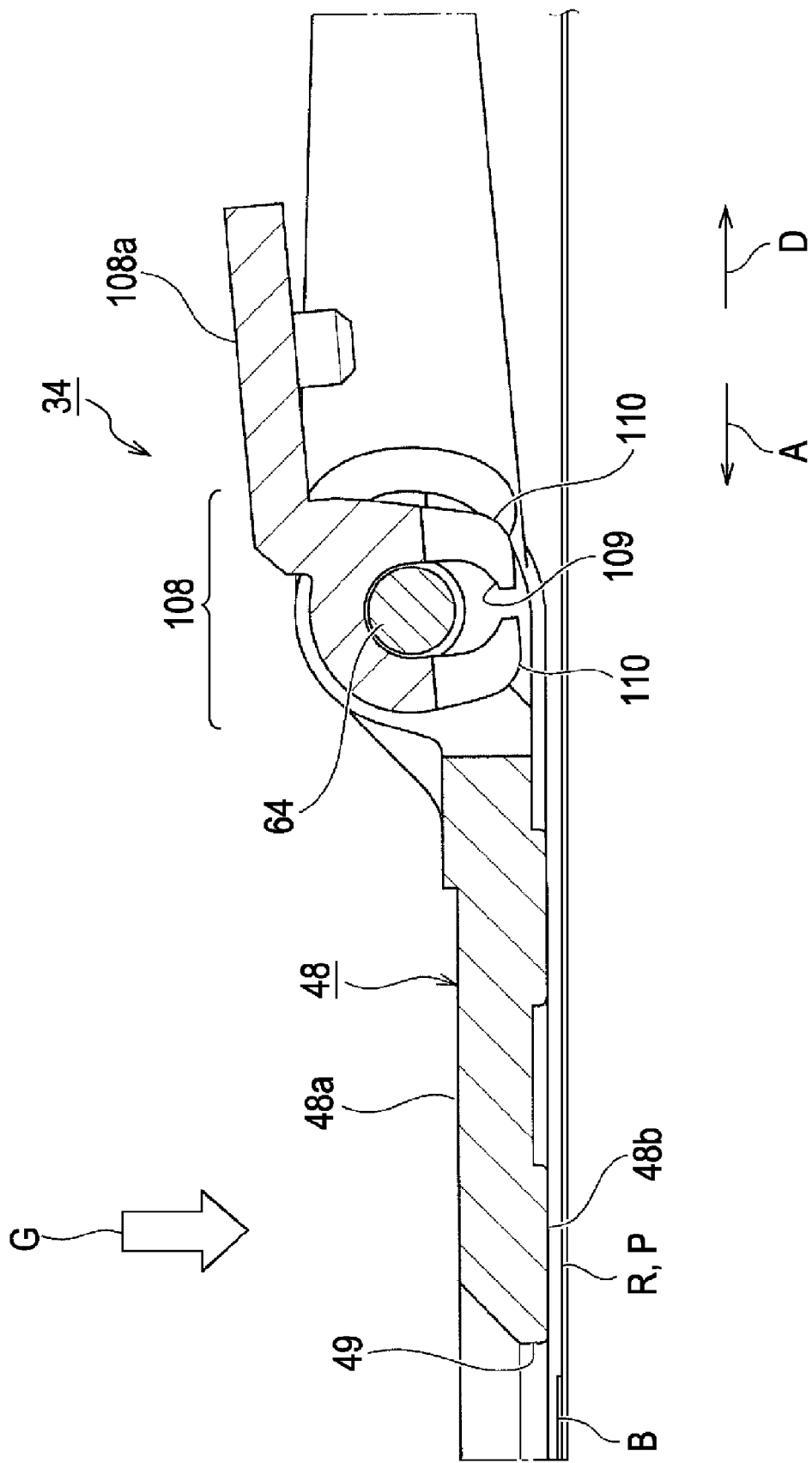
FIG. 14 is an enlarged view of the part XIV in FIG. 13.
Figure 15:
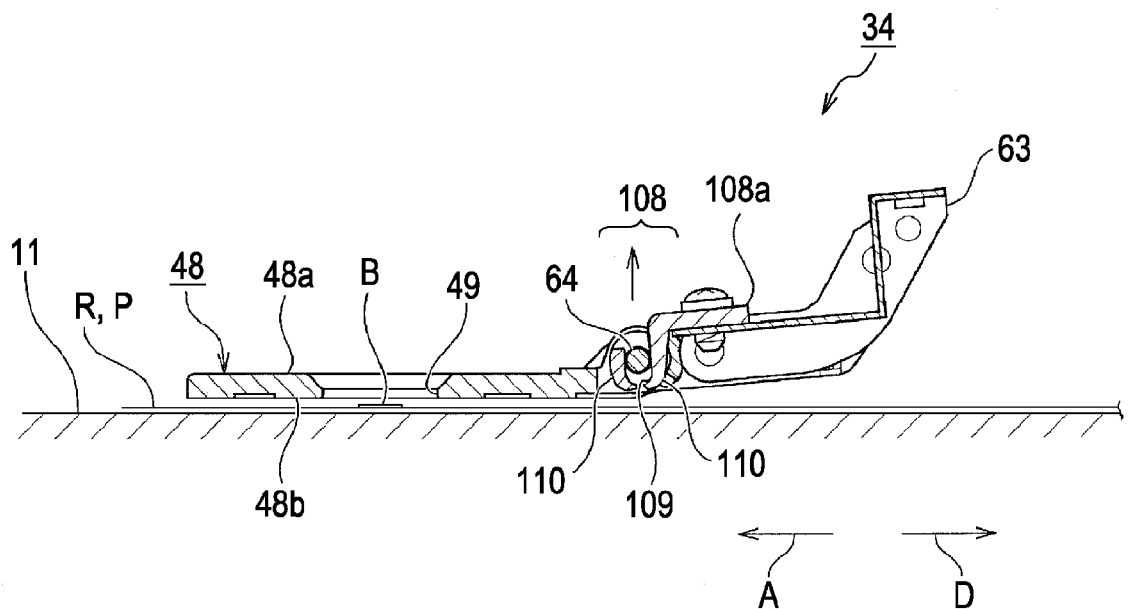
FIG. 15 is a sectional view taken along line XV-XV of FIG. 12 with a retainer plate out of contact with a recording material.
Figure 16:
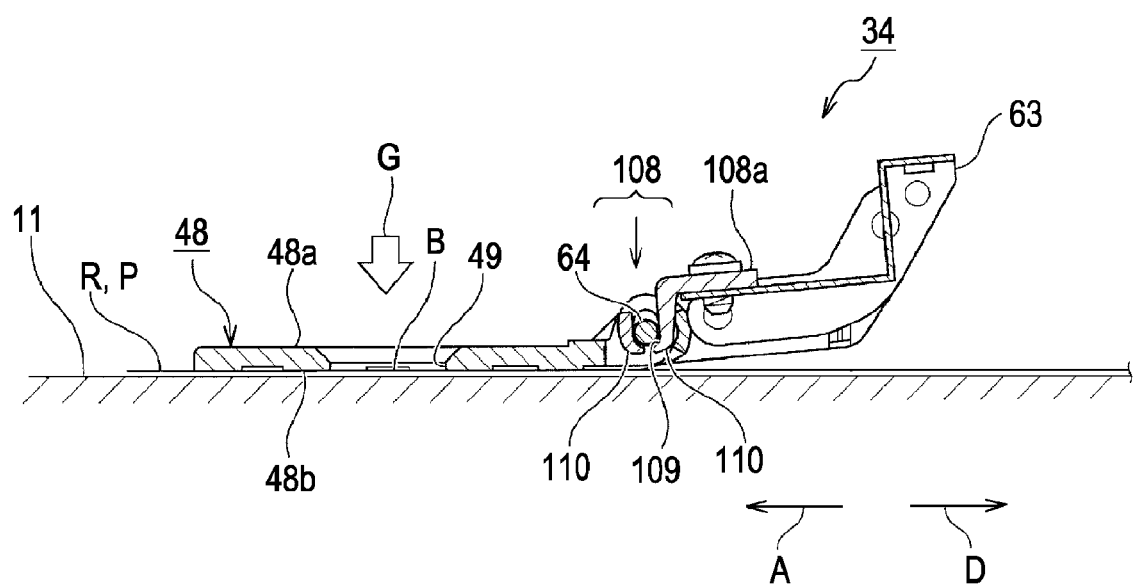
FIG. 16 is a sectional view taken along line XV-XV of FIG. 12 with the retainer plate in contact with the recording material.

Next, a specific description will be given of the color measuring device unit 1 that is a feature of the invention and is applied to the ink jet recording apparatus 100 having the above-described structure. FIG. 6 is a perspective view showing the operation of the color measuring device during color measurement. FIG. 7 is an enlarged perspective view showing the structure of the color measuring device. FIG. 8 is a front view of the color measuring device. FIG. 9 is a side view showing the relationship between the structure of the color measuring device and the force transmitted to a retainer member. FIG. 10 is a side view showing a colorimeter carriage. FIG. 11 is an enlarged view of the part XI in FIG. 10. FIG. 12 is a perspective view showing the retainer member. FIG. 13 is a sectional view taken along line XIII-XIII of FIG. 12 and showing the retainer member with a support arm removed. FIG. 14 is an enlarged view of the part XIV in FIG. 13. FIG. 15 is a sectional view taken along line XV-XV of FIG. 12 and showing the retainer member before a retainer plate comes into contact with the recording material on the transport guide plate. FIG. 16 is a sectional view taken along line XV-XV of FIG. 12 and showing the retainer member with the retainer plate in contact with the recording material on the transport guide plate.

As shown in FIGS. 5 to 8, the color measuring device unit 1 includes a color measuring device 82, a drying device 83, and a housing cover 30 covering them. Left and right side covers (not shown) of the housing cover 30 each has a guide groove (not shown) formed therein. Left and right fitting shafts (not shown) are provided downstream of the recording position 26 in the recording apparatus main body 3. By fitting the fitting shafts in the guide grooves, the color measuring device unit 1 is attached to the recording apparatus main body 3 of the ink jet recording apparatus 100. In the shown color measuring device unit 1, the drying device 83 is located downstream of the recording position 26, and the color measuring device 82 is located downstream of the drying device 83.

As shown in FIG. 6, the color measuring device 82 basically includes a colorimeter 31, a colorimeter holder 32, a carriage reciprocating mechanism 33, a link mechanism 44, a retainer member 34, a rotation shift mechanism 35, a contact mechanism 106, a white tile 36, and a tile holder 37.

As shown in FIG. 5, the drying device 83 basically includes a suction fan (not shown) that takes in air from the outside, a heater (not shown) that heats the taken-in air, and a wind guide (not shown) that guides the air taken-in by the suction fan (hot air or cool air) to a drying region 81 provided upstream of the color measuring region 80.

The colorimeter 31 is a measuring device that irradiates a color measuring pattern B (hereinafter also referred to as color patch B, which is a typical example of the color measuring pattern) recorded on the recording surface of the roll paper R or the single sheet P, measures color information for color proofing serving as color measurement data on the basis of the light reflected by the color patch B, and obtains a correction value. For example, color information based on the Lab color mode that defines a color value by white balance, chromaticity, and lightness can be used as color information. The RGB color mode is used on the side of a monitor, and the CMYK color mode is used on the side of the ink jet recording apparatus 100. Therefore, the color information based on the Lab color mode measured by the colorimeter 31 is converted into the RGB color mode or the CMYK color mode, and the correction value on the side of the monitor or the ink jet recording apparatus 100 is calculated and applied.

The colorimeter holder 32 is a holding member for the colorimeter 31 and includes an open-fronted, open-topped, and open-bottomed holder case 41, and a case cover 42 covering the top of the holder case 41. On the lower surface of the colorimeter holder 32, two pairs of wheels 47 are arranged in a scanning direction C (FIG. 6) that is the moving direction for color measurement of the colorimeter 31. Each pair of wheels includes a base end side wheel 45 and a free end side wheel 46 arranged across the color measuring region 80 from each other (FIG. 5). In this embodiment, the base end side wheel 45 and the free end side wheel 46 are, for example, bearings.

The carriage reciprocating mechanism 33 reciprocates the colorimeter 31 held by the colorimeter holder 32 in the scanning direction C. The carriage reciprocating mechanism 33 basically includes a colorimeter carriage 51, two guide shafts, a carriage drive motor 54, and an endless timing belt 59. The colorimeter carriage 51 is linked to the colorimeter holder 32 by the link mechanism 44 and reciprocates together with the colorimeter 31. The two guide shafts include a main shaft 52 and a sub-shaft 53 and guide the movement of the colorimeter carriage 51. The carriage drive motor 54 serves as a drive source for reciprocating the colorimeter carriage 51. The endless timing belt 59 receives the driving force of the carriage drive motor 54 and actually reciprocates the colorimeter carriage 51.

The stroke in the scanning direction C that can be scanned by the carriage reciprocating mechanism 33 is set to the length over which color patches B are arranged in the scanning direction C. Therefore, it is shorter than the moving stroke of the ink jet recording apparatus 100 capable of recording up to B0 plus size.

Link Mechanism

The link mechanism 44 allows the wheels 47 provided on the lower surface of the colorimeter holder 32 to be always kept in contact with a retainer plate 48 in a below-described retainer member 34. The colorimeter holder 32 is linked by the link mechanism 44 rotatably by a predetermined angle around a first axis X along the scanning direction C that is the reciprocating direction on the retainer member 34, and rotatably by a predetermined angle around a second axis Y along the surface of the recording material R or P held by the retainer member 34 and perpendicular to the scanning direction C, that is, the first axis X (FIG. 7).

The link mechanism 44 has a pair of links: a first link 101 and a second link 102 on each of the front and rear sides in the scanning direction C (each of the left and right sides of the colorimeter holder 32 as viewed from the front). In this embodiment, the first link 101 on the left side of the colorimeter holder 32 and the first link 101 on the right side of the colorimeter holder 32 are integrated by a bar (not shown) into an H shape. Similarly, the second link 102 on the left side of the colorimeter holder 32 and the second link 102 on the right side of the colorimeter holder 32 are integrated by a bar (not shown) into an H shape.

On each of the left and right sides of the colorimeter holder 32, first ends of the first link 101 and the second link 102 are rotatably connected through a first linking shaft 101a and a second linking shaft 102a to the colorimeter carriage 51, and second ends of the first link 101 and the second link 102 are rotatably connected through a third linking shaft 101b and a fourth linking shaft 102b to the colorimeter holder 32. On the first end side of the first link 101 and the second link 102, the second linking shaft 102a is movable within a predetermined range in a pressing direction G of the retainer member 34, and the first linking shaft 101a is movable within a predetermined range in the pressing direction G and a direction along the second axis Y perpendicular to the pressing direction G.

That is, as a feature of the present invention, the connection between the upper first link 101 and the colorimeter carriage 51 (the first linking shaft 101a) is provided with a clearance in two directions: the pressing direction G and a direction perpendicular to the scanning direction C of the colorimeter 31, parallel to the recording surface of the recording material R or P, and along the second axis Y (corresponding to the transport direction A). The connection between the lower second link 102 and the colorimeter carriage 51 (the second linking shaft 102a) is provided with a clearance in the pressing direction G.

As enlarged in FIGS. 10 and 11, in the side surface of the colorimeter carriage 51, an upper elongate hole 103 is formed that has a diameter larger than the diameter of the first linking shaft 101a of the first link 101 and is elongate in the transport direction A, and a lower elongate hole 104 is formed that has substantially the same diameter as the diameter of the second linking shaft 102a of the second link 102 and is somewhat elongate in the pressing direction G. Within the range of the clearance between the elongate hole 103 and the first linking shaft 101a and the range of the clearance between the elongate hole 104 and the second linking shaft 102a, the above-described two types of clearances are formed. Between the elongate hole 103 and the elongate hole 104, a spring support shaft 105 is provided somewhat above the elongate hole 104 so as to project outward horizontally. Using this spring support shaft 105, a first spring (pressing spring) 107 is attached that is a component of a below-described contact mechanism 106.

Since such clearances are provided in the connections between the link mechanism 44 and the colorimeter carriage 51, the colorimeter holder 32 to which the colorimeter 31 is attached can rotate by a predetermined angle, with the second linking shaft 102a as a fulcrum, within the range of the clearance formed between the first linking shaft 101a and the elongate hole 103 around the first axis X parallel to the scanning direction C, and the unevenness of the retainer member 34 in the transport direction A can be absorbed within the range of the angle. Due to the clearance in the pressing direction G formed between the first linking shaft 101a and the elongate hole 103 and the clearance in the pressing direction G formed between the second linking shaft 102a and the elongate hole 104 on each of the left and right sides of the colorimeter holder 32, the colorimeter holder 32 to which the colorimeter 31 is attached can rotate by a predetermined angle around the second axis Y parallel to the transport direction A within the range of each clearance, and the unevenness of the retainer member 34 in the scanning direction C can be absorbed within the range of the angle.

The clearance formed between the second linking shaft 102a and the elongate hole 104 is small compared to the clearance formed between the first linking shaft 101a and the elongate hole 103. The reason is that the second linking shaft 102a serves as a reference point to determine the positional relationship between the link mechanism 44 and the colorimeter carriage 51, and the first linking shaft 101a serves as a displacement point that takes into account the working length L to correct the angle of the colorimeter holder 32 to which the colorimeter 31 is attached, with the reference point as a fulcrum. In addition, the link mechanism 44 serves to smooth the movement of the colorimeter holder 32 between a below-described tile holder 37 and the retainer member 34.

Retainer Member

As shown in FIGS. 5 and 6, during color measurement, the retainer member 34 assumes a pressing position in which the retainer member 34 presses the recording surface of the roll paper R or the single sheet P on which color patches B are recorded. After color measurement, the retainer member 34 is retracted upward. Except during color measurement, the retainer member 34 assumes a retracted position in which the retainer member 34 allows the roll paper R or the single sheet P to be transferred. The retainer member 34 includes a support arm 63 that rotates in the range of about 90 degrees around rotating shafts 62 integral therewith, a flat retainer plate 48 that is rotatably connected to the free end of the support arm 63 through a rotation pin 64 serving as a shaft, and a retainer plate support spring and a retainer plate pressing spring (not shown) that are provided in a compressed state between the support arm 63 and the retainer plate 48.

The support arm 63 is a curved plate-like rotatable arm that is long in the scanning direction C. At the base end of the support arm 63, the rotating shafts 62 are integrally formed so as to project leftward and rightward. On the left and right sides of the rotating shafts 62, sector gears 67 are provided that are toothed in the range of about 90 degrees. The retainer plate 48 is a rectangular flat plate-like member that is long in the scanning direction C. In the middle of the upper surface of the retainer plate 48, a window 49 extending in the scanning direction C is provided so as to pass through the upper and lower surfaces of the retainer plate 48.

The window 49 is an opening for allowing the irradiation light from the colorimeter 31 and the reflected light from the roll paper R or the single sheet P to pass. The upper surface of the retainer plate 48 around the window 49 serves as a guide surface 48a that comes into contact with and guides the base end side wheels 45 and the free end side wheels 46 provided on the lower surface of the colorimeter holder 32. The lower surface of the retainer plate 48 around the window 49 serves as a pressing surface 48b that acts on and directly presses the recording surface of the roll paper R or the single sheet P reaching the color measuring region 80.

As another feature of the present invention, a support plate 108a is provided in the middle connection 108 in the width direction between the retainer plate 48 and the support arm 63, and the support plate 108a is provided with a clearance that allows the retainer plate 48 to move in the pressing direction G. The retainer member 34 is formed of a flexible material and is supported so as to permit rotation around an axis parallel to the reciprocating direction and partial deflection deformation.

As shown in FIGS. 12 to 14, the support plate 108a is provided with a pair of opposed locking claws 110 so that an elongate hole 109 extending in the pressing direction G is formed therein. The middle portion in the longitudinal direction of the retainer plate 48 can move in the pressing direction G within the range of the clearance between the elongate hole 109 and the rotation pin 64 fitted in the elongate hole 109.

By providing such a clearance in the connection between the retainer plate 48 and the support arm 63, the following advantageous effect can be obtained. In a state where the retainer member 34 is brought into contact with the roll paper R or the single sheet P supported by the transport guide plate 11 by its own contact force (the urging force, for example, of the retainer plate support spring), even if, due to the deflection, the rotation pin 64 is located in the upper part of the elongate hole 109 and the retainer member 34 is partially out of contact with the roll paper R or the single sheet P as shown in FIG. 15, the colorimeter holder 32 to which the colorimeter 31 is attached moves on the retainer member 34 with the wheels, and the retainer member 34 is thereby subjected to a pressing force. Subjected to this pressing force, the rotation pin 64 can move to the lower part of the elongate hole 109 as shown in FIG. 16. Therefore, even if there is a deflection in the longitudinal direction, or the scanning direction C, the retainer plate 48 is subjected to the pressing force and is deformed so as to correct the deflection, the distance between the colorimeter 31 and the color patches B is kept uniform, and the color measurement accuracy is improved.

The rotation shift mechanism 35 is a shift mechanism for switching between the pressing position and the retracted position of the retainer member 34. The rotation shift mechanism 35 includes a retainer member drive motor 70 serving as a drive source and a gear train 71 for transmitting the rotation of the retainer member drive motor 70 to the sector gears 67.

Contact Mechanism

The contact mechanism 106 is one of the features of the present invention and is a mechanism for bringing both the base end side wheel 45 and the free end side wheel 46 into contact with the guide surface 48a of the retainer plate 48 at the same time during color measurement. The contact mechanism 106 includes the pressing spring 107 serving as a first spring that urges in the pressing direction G of the retainer plate 48, the link mechanism 44 that suspends the colorimeter holder 32 to which the colorimeter 31 is attached, and the colorimeter holder 32 to which the colorimeter 31 is attached and that generates a force pressing in the direction of gravitational force due to its own weight.

The line of action of the resultant pressing force F generated toward the retainer member 34 by the resultant force of the urging force P1 of the first spring, the suspending force P2 of the link mechanism, and the weight W of the colorimeter holder 32 to which the colorimeter 31 is attached is substantially the same as the normal to the sloping surface (the transport guide plate 11) passing midway between the base end side wheel 45 and the free end side wheel 46. That is, the resultant pressing force F generated toward the retainer member 34 by the resultant force of the urging force P1 of the pressing spring 107, the suspending force P2 of the link mechanism 44, and the weight W of the colorimeter holder 32 to which the colorimeter 31 is attached acts on an intermediate part between the base end side wheel 45 and the free end side wheel 46 and is balanced with the reaction forces N1 and N2 from the transport guide plate 11.

Specifically, $$\text{resultant pressing force } F = \text{reaction force } N1 + \text{reaction force } N2 = \text{urging force } P1 + \text{weight } W \cdot \cos\theta \quad (1)$$

$$\text{suspending force } P2 = \text{weight } W \cdot \sin\theta \quad (2)$$

The equilibrium of moment about the point O of application is as follows:

$$P1 \cdot L2 = N1 \cdot L1 - N2 \cdot L1 + W \cdot L3 - P2 \cdot L4 \quad (3)$$

where L1 to L4 are the distances from the point O of application of the resultant pressing force F as shown in FIG. 9. If $N1 = N2$, $$P1 \cdot L2 = W \cdot L3 - P2 \cdot L4 \quad (4)$$

By using such a contact mechanism 106, both the base end side wheel 45 and the free end side wheel 46 can always be kept in contact with the guide surface 48a of the retainer plate 48, and the color measurement accuracy is further improved.

The white tile 36 is a ceramic tile for performing calibration of the colorimeter 31 at a time except during color measurement. The white tile 36 is detachably held by the tile holder 37. The tile holder 37 is provided in a home position region of the carriage reciprocating mechanism 33 located lateral to the transport path for transporting the roll paper R or the single sheet P on which color patches B are recorded. When color measurement is not performed, the colorimeter carriage 51 is located in the home position, the colorimeter 31 is located over the white tile 36 and functions as a cap that protects the upper surface of the white tile 36 against dust and/or the like.

Next, a brief description will be given of the drying and color measurement of the color measuring pattern B performed by using the color measuring device unit 1 having the above-described structure. The roll paper R or the single sheet P on which color patches B are recorded at the recording position 26 is transported to the drying region 81 provided downstream in the transport direction A. By hot air or cool air from the drying device 83 provided in the drying region 81, the color patches B are dried.

After the drying of the color patches B is completed, the roll paper R or the single sheet P is transported further downstream in the transport direction A and reaches the color measuring region 80. In the color measurement region 80, the above-described color measuring device 82 operates. First, the retainer member 34 fixes the roll paper R or the single sheet P to the transport guide plate 11. Next, the carriage drive motor 54 is activated, the colorimeter carriage 51 is moved from the home position to the color measuring region 80, and the colorimeter 31 is reciprocated in the scanning direction C to obtain desired color measurement data.

In this embodiment, by the actions of the clearance provided in the connection between the link mechanism 44 and the colorimeter carriage 51, the clearance provided in the connection between the retainer plate 48 and the support arm 63, and the contact mechanism 106, color measurement is performed with a high degree of accuracy without being affected by the deflection of the retainer member 34 and/or the transport guide plate 11.

Other Embodiments

The recording apparatus 100 of the present invention is based on the above-described structure. However, of course, partial changes or omissions may be made without departing from the scope of the invention.

The transport guide surface (transport guide plate 11) of the above-described ink jet recording apparatus 100 slopes down to the front at an angle of about 60 degrees. However, of course, the invention is not limited to this sloping surface structure. That is, the transport guide surface that supports the recording material P and guides the transport may be at another angle or may be a horizontal surface.

Figure 17:
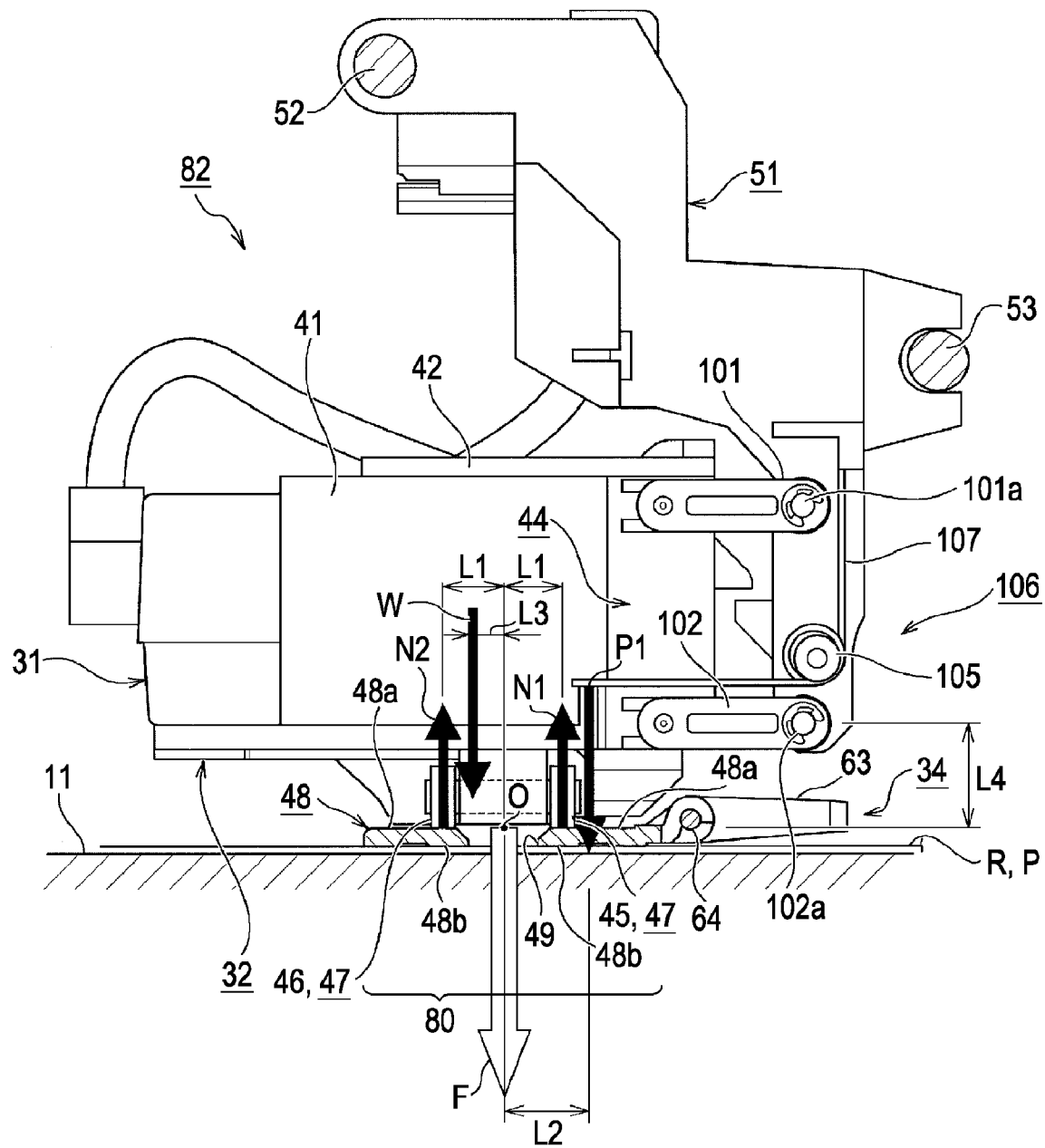
FIG. 17 is a side view corresponding to FIG. 9 in the case where the transport guide surface is a horizontal surface.

FIG. 17 is a side view corresponding to FIG. 9 in the case where the transport guide surface is a horizontal surface. As shown in FIG. 17, there is not the suspending force P2 (FIG. 9) in the case where the transport guide surface slopes, and a resultant pressing force F is determined by only the weight W of the colorimeter holder 32 and the urging force P1 of the pressing spring 107. That is, the line of action of the resultant pressing force F is substantially the same as the normal to the horizontal transport guide surface passing between the base end side wheel 45 and the free end side wheel 46.

In the case of this horizontal surface structure, the resultant pressing force F is as follows:

resultant pressing force $F$=reaction force $N1$+reaction force $N2$=urging force $P1$+weight $W$ (5)

The equilibrium of moment about the point O of application is as follows:

$P1 \cdot L2 = N1 \cdot L1 - N2 \cdot L1 + W \cdot L3$ (6)

where L1 to L3 are the distances from the point O of application of the resultant pressing force F as shown in FIG. 17. If N1=N2, $P1 \cdot L2 = W \cdot L3$ (7)

The above-described color measuring device unit 1 is not integral with the recording apparatus main body 3. Therefore, the color measuring device unit 1 do not always have to be preinstalled in the ink jet recording apparatus 100 and can be attached to the recording apparatus main body 3 as an optional extra.

The color measuring device unit 1 can be applied not only to a large-sized ink jet recording apparatus 100 such as that of the above embodiment but also to small-sized and middle-sized ink jet recording apparatuses.

Instead of or in addition to the clearances provided in the connections between the colorimeter carriage 51 and the link mechanism 44, clearances may be provided in the connections between the colorimeter holder 32 and the link mechanism 44. Accordingly, the elongate holes 103 and 104 can be provided in the colorimeter carriage 51, the link mechanism 44, or the colorimeter holder 32.

Similarly, the elongate hole 109 can be provided in the support plate 108, the support arm 63, or the retainer plate 48. The invention is not limited to providing an elongate hole 109 in the middle connection 108 between the retainer plate 48 and the support arm 63. A plurality of elongate holes 109 can be provided in different places.

The contact mechanism 106 is not limited to that of the above-described embodiment. Any other various types of contact mechanisms can be used. For example, the base end side wheel 45 and the free end side wheel 46 can be attached to the guide surface 48a of the retainer plate 48 by means of a magnetic force.

What is claimed is:

1. A recording apparatus comprising:
    a colorimeter that obtains color measurement data from a recording surface of a recording material;
    a colorimeter holder that holds the colorimeter;
    a colorimeter carriage that reciprocates the colorimeter holder on a retainer member that holds the recording material during color measurement; and
    a link mechanism that links the colorimeter holder and the colorimeter carriage,
    wherein the colorimeter holder is linked by the link mechanism rotatably by a predetermined angle around a first axis along the reciprocating direction on the retainer member, and rotatably by a predetermined angle around a second axis that is perpendicular to the reciprocating direction and is along the surface of the recording material held by the retainer member.

2. The recording apparatus according to claim 1, wherein the link mechanism has a pair of first and second links on each of the front and rear sides in the reciprocating direction,
    first ends of the first link and the second link are rotatably connected through a first linking shaft and a second linking shaft to the colorimeter carriage, and second ends of the first link and the second link are rotatably connected through a third linking shaft and a fourth linking shaft to the colorimeter holder, and
    on at least one of the first end side and the second end side of the first link and the second link, one of the linking shafts is movable within a predetermined range in a pressing direction of the retainer member, and the other linking shaft is movable within a predetermined range in the pressing direction and a direction along the second axis perpendicular to the pressing direction.

3. The recording apparatus according to claim 1, wherein the retainer member includes a retainer plate that presses the recording material, and a support arm to which the retainer plate is rotatably connected through a shaft, and
the shaft is rotatably supported so as to be at least partially movable in the pressing direction.

4. The recording apparatus according to claim 1, wherein the retainer member is formed of a flexible material and is supported so as to permit rotation around an axis parallel to the reciprocating direction and partial deflection deformation.

5. The recording apparatus according to claim 1, wherein a transport guide surface that supports the recording material and guides the transport is a sloping surface or a horizontal surface.

6. The recording apparatus according to claim 1, wherein the colorimeter holder has wheels for moving on the retainer member during color measurement, the wheels including a base end side wheel and a free end side wheel, and
further comprising a contact mechanism for bringing both the base end side wheel and the free end side wheel into contact with the retainer member at the same time during color measurement.

7. The recording apparatus according to claim 6, wherein the surface of the recording material held by the retainer member is a sloping surface, the contact mechanism includes:
a first spring that urges the colorimeter holder toward the retainer member;
the link mechanism that suspends the colorimeter holder; and
the colorimeter holder to which the colorimeter is attached and that generates a force pressing in the direction of gravitational force due to its own weight, and
the line of action of the resultant pressing force F generated toward the retainer member by the resultant force of the urging force P1 of the first spring, the suspending force P2 of the link mechanism, and the weight W of the colorimeter holder to which the colorimeter is attached is substantially the same as the normal to the sloping surface passing between the base end side wheel and the free end side wheel.

8. The recording apparatus according to claim 6, wherein the surface of the recording material held by the retainer member is a horizontal surface, the contact mechanism includes:
a first spring that urges the colorimeter holder toward the retainer member; and
the colorimeter holder to which the colorimeter is attached and that generates a force pressing in the direction of gravitational force due to its own weight, and
the line of action of the resultant pressing force F generated toward the retainer member by the resultant force of the urging force P1 of the first spring, and the weight W of the colorimeter holder to which the colorimeter is attached is substantially the same as the normal to the horizontal surface passing between the base end side wheel and the free end side wheel.

* * * * *